May 24, 1932.  L. R. ROSS  1,859,531
MECHANICAL CONNECTION
Original Filed Oct. 15, 1930
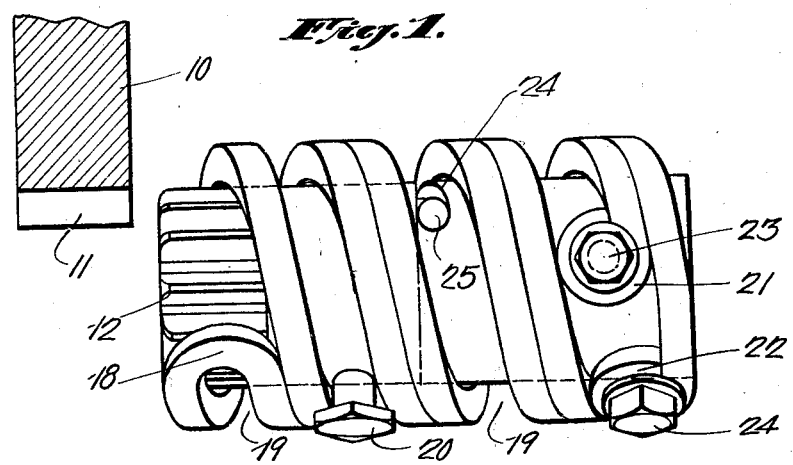
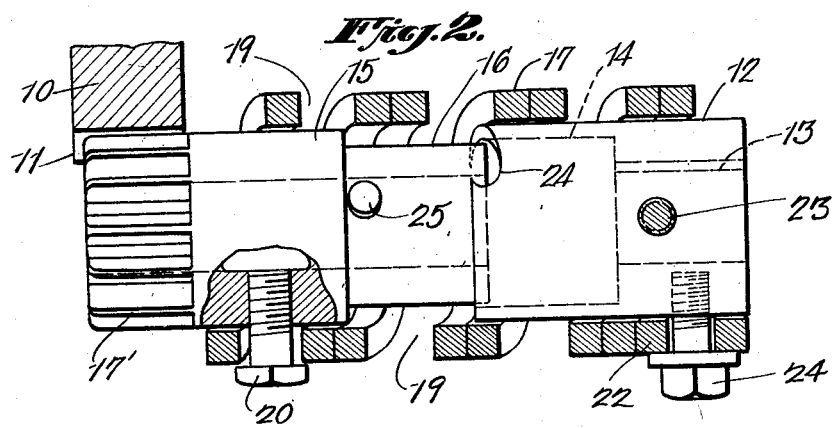
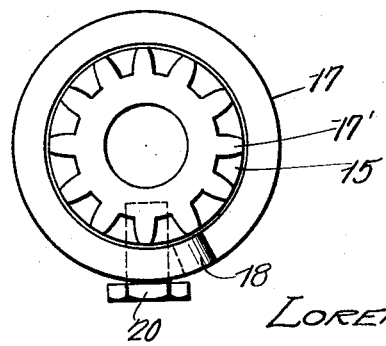
Inventor
LORENZO R. ROSS.
By *Clarence A O'Brien*
Attorney Patented May 24, 1932

1,859,531

UNITED STATES PATENT OFFICE

LORENZO R. ROSS, OF BUTLER, PENNSYLVANIA

MECHANICAL CONNECTION

Application filed October 15, 1930, Serial No. 488,934. Renewed March 30, 1932.

This invention relates to improvements in mechanical connections between electric motors, and the fly-wheels of internal combustion motors of the type wherein the mechanical connection is automatically established and automatically broken.

Devices of this character are, in operation, subjected to sudden and severe shocks, and it is an object of the present invention, to provide a novel construction which will be capable of withstanding such shocks without injury thereto.

Other objects of the invention reside in certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings;

Figure 1 is a view in elevation illustrating a device constructed in accordance with the present invention, a portion of an internal combustion motor being illustrated in section, and;

Figure 2 is a longitudinal sectional view, and;

Figure 3 is a view in end elevation.

Referring to the drawings by reference character, 10 designates a portion of an internal combustion motor, and as is the common practice, the flywheel is provided on its periphery with a plurality of teeth 11.

A device of the type of the present invention is adapted for attachment to the armature shaft of an electric motor, and the present device includes a coupling member 12 formed on one end with a recess 13 which receives the free end of an electric motor shaft to provide for attachment of the device thereto. The opposite end of the coupling member 12 is formed with an enlarged recess 14, and adapted for sliding movement within this enlarged recess 14, there is an elongated member 15 having a reduced portion 16 for reception in the enlarged recess 14. The member 15 is provided upon its free end with a gear 17' which is adapted for meshing engagement with the teeth 11 on the flywheel 10 as illustrated in Figure 2.

The driving connection between the members 12 and 15 is of a yielding type, and preferably comprises a coil spring 17. The coil spring herein illustrated is formed from a single length of material preferably rectangular in cross-section, and said length of material is looped or bent upon itself at a point between its end as at 18, and it is so formed, that except for a short distance from its looped end, the convolutions of the spring are double with the portions of each convolution in close contact with each other. The convolutions of the spring are spaced to provide a guideway 19 in which is received a guide pin or bolt 20 carried by the member 15, and this guideway 19, functions to move the member 15 in such a manner that the gear 17' moves into and out of engagement with the teeth 11 of the flywheel 10 to drive the latter when the member 12 is rotated by an electric motor. Engagement of the pin or bolt 20 in the looped portion 18 of the spring provides a stop for limiting the outward movement of the member 15.

The opposite end of the coil spring is connected to the member 12, and to provide for this connection, the ends of the members which form the convolutions of the coil spring may be looped to form eyes 21 and 22 for the reception of bolts or the like 23 and 24 respectively.

The outer edge of the member 12 may be notched as at 24 for the reception of a pin or the like 25 carried by the reduced portion 16 of the member 15 to prevent relative rotating movement of the members 12 and 15 when the member 15 is retracted as illustrated in Figure 1.

The device operates in the following manner;

With the parts in the position illustrated in Figure 1, rotation of the member 12 by an electric motor, not shown, will cause rotation of the spring 17. Rotation of the spring 17, causes movement of the member 15 to the position in which it is illustrated in Figure 2, and an engagement of the gear 17' with the teeth 11 of the flywheel 10, to drive the latter. The shock incident to this operation is absorbed by the spring 17, and immediately the flywheel begins to rotate under the influence of its motor, the member 16 will be retracted to the position in which it is illustrated in Figure 1, and the gear disengaged from the flywheel teeth 11.

While the invention has been herein illustrated in a preferred form, it is to be understood, that it is not to be limited to the precise construction shown, and that it may be practiced in other forms without departing from the scope of the appended claims.

Having thus described the invention, what is claimed as new and what it is desired to secure by Letters Patent of the United States, is;

1. In a mechanism of the class described, a driving member having an axial recess opening out through one end thereof, a driven member having an attaching portion movable longitudinally in said recess, a helical spring encircling the driving and driven members and having convolutions spaced uniformly for the major portion of the length of the spring, means anchoring one end of the spring to said driving member, the other end of the spring being provided with a loop, a pin carried by said driven member and movable between said uniformly spaced convolutions and engageable with said loop, said driving and driven members being formed with annular shoulders constituting a means to limit compression of said spring.

2. In a mechanism of the class described, a driving member having an axial recess opening out through one end thereof, a driven member having an attaching portion movable longitudinally in said recess, a helical spring encircling the driving and driven members and having convolutions spaced uniformly for the major portion of the length of the spring, means anchoring one end of the spring to said driving member, the other end of the spring being provided with a loop, a pin carried by said driven member and movable between said uniformly spaced convolutions and engageable with said loop, said driving and driven members being formed with annular shoulders constituting a means to limit compression of said spring; and a second pin carried by said driven member, said shoulder of the driving member being provided with a notch to receive said second named pin.

In testimony whereof I affix my signature.

LORENZO R. ROSS.